United States Patent
Yashiki

(12) 
(10) Patent No.: US 6,512,593 B1
(45) Date of Patent: Jan. 28, 2003

(54) INTERNET FACSIMILE APPARATUS AND RELAY APPARATUS SELECTION METHOD

(75) Inventor: Satoshi Yashiki, Yokohama (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/339,043

(22) Filed: Jun. 23, 1999

(30) Foreign Application Priority Data

Feb. 10, 1999 (JP) .......................................... 11-032859

(51) Int. Cl.[7] .......................... G06F 15/00; H04N 1/00; H04N 1/32; H04M 11/00
(52) U.S. Cl. ...................... 358/1.15; 358/402; 358/407; 358/442; 379/100.09
(58) Field of Search ............................... 358/1.15, 442, 358/407, 402; 379/100.09

(56) References Cited

U.S. PATENT DOCUMENTS

| | | | | |
|---|---|---|---|---|
| 5,175,634 A | * | 12/1992 | Matsuzaki | 358/407 |
| 5,410,416 A | * | 4/1995 | Amberg et al. | 358/405 |
| 5,539,530 A | * | 7/1996 | Reifman et al. | 358/400 |
| 5,881,233 A | | 3/1999 | Toyoda et al. | |
| 6,266,160 B1 | * | 7/2001 | Saito et al. | 358/1.15 |

FOREIGN PATENT DOCUMENTS

| | | |
|---|---|---|
| JP | 62286364 | 12/1987 |
| JP | 3-239058 | 10/1991 |
| JP | 3029827 | 7/1996 |
| JP | 10-98495 | 4/1998 |
| JP | 10126549 | 5/1998 |
| JP | 10173899 | 6/1998 |
| JP | 10257103 | 9/1998 |
| JP | 10285328 | 10/1998 |
| JP | 11-4316 | 1/1999 |
| JP | 11-88418 | 3/1999 |
| JP | 11225237 | 8/1999 |

OTHER PUBLICATIONS

English Language Abstract of JP 11–225237.
English Language Abstract of JP 10–285328.
English Language Abstract of JP 10–173899.
English Language Abstract of JP 3–239058.
English Language Abstract of JP 62–286364.
English Language Abstract of JP 11–88418.
English Language Abstract of JP 11–4316.
English Language Abstract of JP 10–98495.
English Language Abstract of JP 10–126549.

* cited by examiner

*Primary Examiner*—Kimberly A. Williams
(74) *Attorney, Agent, or Firm*—Greenblum & Bernstein, P.L.C.

(57) ABSTRACT

The Internet facsimile apparatus in the present invention is provided with data memories such as telephone book data memory, relay FAX data memory and adjacent district number memory. Its collation section collates the telephone number of the recipient with the data of the telephone book memory, then the relay destination search section searches for data in the relay FAX data memory and obtains the address of a relay apparatus candidate. If there is no appropriate relay apparatus in the same district, the adjacent district number search section searches for the number of an adjacent district and continues the search based on the district number. In this way, when carrying out image transmission using the Internet facsimile apparatus as a relay apparatus, the nearest Internet facsimile apparatus suitable for use as a relay apparatus is automatically selected.

6 Claims, 15 Drawing Sheets

| COUNTRY IDENTIFIER | DISTRICT IDENTIFIER | CITY IDENTIFIER | No. |
|---|---|---|---|
| JAPAN 81 | TOKYO 03 | 5434 | 1 |
| | | 3438 | 2 |
| | | | 3 |
| | | ⋮ | ⋮ |
| | YOKOHAMA 045 | 504 | 10 |
| | | 955 | 11 |
| | | ⋮ | ⋮ |
| | ⋮ | ⋮ | ⋮ |
| U.S.A ×× | | | |
| U.K | | | |
| CHINA | | | |
| ⋮ | | | |

FIG. 4

| No. | TELEPHONE NUMBER | | | RELAY FAX MAIL ADDRESS | FAX FUNCTION/PERFORMANCE | | Tel No |
| | COUNTRY | DISTRICT | CITY | | RESOLUTION | TRANSFER SPEED | |
| --- | --- | --- | --- | --- | --- | --- | --- |
| 1 | 81 | 03 | 5435 | ifax@rdmg.mges.mei.co.jp | 400dpi | 28800bps | 03 5434 •••• |
| 2 | 81 | 03 | 3438 | ifax@rdnn.mges.mei.co.jp | 400dpi | 14400bps | 03 3438 •••• |
| 3 | 81 | 045 | 504 | ifax@rdsn.mges.mei.co.jp | 200dpi | 14400bps | 045 504 •••• |
| •••• | •••• | •••• | •••• | •••• | •••• | •••• | •••• |

FIG. 5

| No. | DISTRICT NUMBER | ADJACENCY A | ADJACENCY B |
|---|---|---|---|
| 1 | 03 | 045 | 0×× |
| 2 | 045 | 03 | 0×× |
| 3 | 06 | 0×× | 0×× |
| ⋮ | ⋮ | ⋮ | ⋮ |

FIG. 6 ifax08 # 9999 — 9999 @rdmg.mges.mei.co.jp
                └──────┘
                TRANSMISSION
                TELEPHONE
                NUMBER

FIG. 8

INTERNET FACSIMILE APPARATUS AND RELAY APPARATUS SELECTION METHOD

BACKGROUND OF THE INVENTION

1. Field of the Invention

The present invention relates to Internet facsimile apparatuses and relay apparatus selection methods.

2. Description of the Related Art

An Internet facsimile apparatus is a new facsimile apparatus provided with functions of converting image data to a file accompanying the mail and transmitting/receiving it over a computer network, a typical example of which is the Internet (hereinafter simply referred to as "network").

The Internet facsimile apparatus is capable of carrying out usual facsimile communications over a Public Switched Telephone Network (hereinafter referred to as "PSTN"), and therefore it also functions as a relay apparatus between a computer network and PSTN.

When transmitting an image to a facsimile apparatus connected to the PSTN, transmitting the image over a network using the image data transmission function by E-mail including accompanying files and relay function can drastically reduce communication costs compared to transmitting data only over the PSTN.

To determine the relay apparatus, there is actually no other way than the user directly specifying it for each data transmission or registering the most suitable relay apparatus beforehand. However, if, for example, it is the first time the user communicates with that recipient, it is quite difficult and troublesome to select the nearest relay apparatus. Still worse if communicating with a recipient abroad.

Such inconvenience is an obstacle to spreading comfortable facsimile communications using the functions of Internet facsimile apparatuses to the fullest.

SUMMARY OF THE INVENTION

A first objective of the present invention is to provide an Internet facsimile apparatus enabling automatic selection of a relay apparatus suitable for a last destination.

A second objective of the present invention is to provide a relay apparatus selection method enabling automatic selection of a relay apparatus suitable for a last destination.

Taking notice of the fact that a telephone number contains information (identifier and ID number) that identifies the country, district, city, etc., the present invention registers telephone number data containing geographical ID information in a storage means beforehand, compares the telephone number of the recipient with the registered telephone number data, detects points which agree between them and finds the address of the relay destination i.e. a relay apparatus from the detection result. In principle, it is desirable to use as the relay apparatus, an Internet facsimile apparatus installed in the same district as that for the recipient apparatus.

At this time, if additional information such as the performance of the relay apparatus is registered together, it is possible to automatically obtain the address of the relay apparatus that will function as the relay apparatus by taking into account the performance of the relay apparatus, etc. This improves the usability for the user.

The aforementioned objects can be achieved by an Internet facsimile apparatus, having: first communication means for carrying out facsimile communications over a PSTN; second communication means for transmitting images over a computer network; and relay apparatus selection means for automatically selecting a relay apparatus based on the telephone number of the recipient.

The aforementioned objects can be achieved by an Internet facsimile apparatus, which has a function of carrying out facsimile communications over a PSTN as well as a function of carrying out facsimile communications over a computer network, and is capable of converting the image data format to send the data as E-mail. The apparatus having: a telephone book data memory storing telephone number data including the country identifier of the terminal belonging to the PSTN; a relay apparatus data memory storing at least the telephone number data and address data of the relay apparatus which belongs to both the PSTN and the computer network, and has a communication relay function; collation means for collating the telephone number of the recipient entered with the telephone number data stored in the telephone book data memory, confirming that the telephone number data contain at least data that can be assumed to correspond to the telephone number entered and acquiring the confirmed telephone number data; search means for comparing the district identifier information of the obtained telephone number data with the corresponding identifier information of the telephone number data stored in the relay apparatus data memory, and acquiring, if there is matched identification information, the address data of the relay apparatus having as its telephone number the matched identifier information as the address of the relay apparatus candidate; and transmission means for transmitting E-mail obtained by converting image data format to one of relay apparatus candidates.

The aforementioned objects can be achieved by a relay apparatus selection method for an Internet facsimile apparatus to transmit image data to its recipient over a computer network, a relay apparatus connected to this computer network and a PSTN sequentially. The above method having registering the telephone number, address and performance information of the relay apparatus in memory beforehand; comparing the district identification information of the telephone number of the recipient with the district identification information of the telephone number of the relay apparatus, examining whether the corresponding identifier matches or mismatches and storing the address of the relay apparatus as a relay apparatus candidate if there is at least one matched identifier; and selecting one of the relay apparatus candidates and acquiring the address of the relay destination.

The aforementioned objects can be achieved by an image communication system wherein a network facsimile apparatus transmits image data to its recipient over a communication route including a computer network, relay apparatus connected to this computer network and PSTN. The above method having a storage apparatus storing the telephone number, address and performance information of a relay apparatus installed on the communication route; and a relay apparatus selection apparatus installed on the communication route which compares the district identification information of the telephone number of the recipient with the district identification information of the telephone number of the relay apparatus, examines whether the corresponding identifier matches/mismatches, and stores, if there is at least one identifier, the address of the relay apparatus as a relay apparatus candidate and outputs one of the stored addresses as the relay address.

According to the present invention, it possible to send E-mail by automatically obtaining the relay address. Thereby, a simple way of making use of low-cost facsimile transmission using a network facsimile apparatus is provided. The use of telephone number information also helps reduce the amount of information and avoids the possibility of extremely increasing the size of the apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a drawing showing an example of data content stored in telephone book data memory according to the embodiment above;

FIG. 5 is a drawing showing an example of data content stored in relay FAX data memory according to the embodiment above;

FIG. 6 is a drawing showing an example of data content stored in adjacent district number memory according to the embodiment above;

FIG. 8 is a drawing showing an example of address data format to be sent to the Internet facsimile apparatus functioning as a relay apparatus;

DETAILED DESCRIPTION OF THE PREFERRED EMBODIMENTS

With reference now to the attached drawings, the embodiments of the present invention are explained in detail below.

Figure 1:
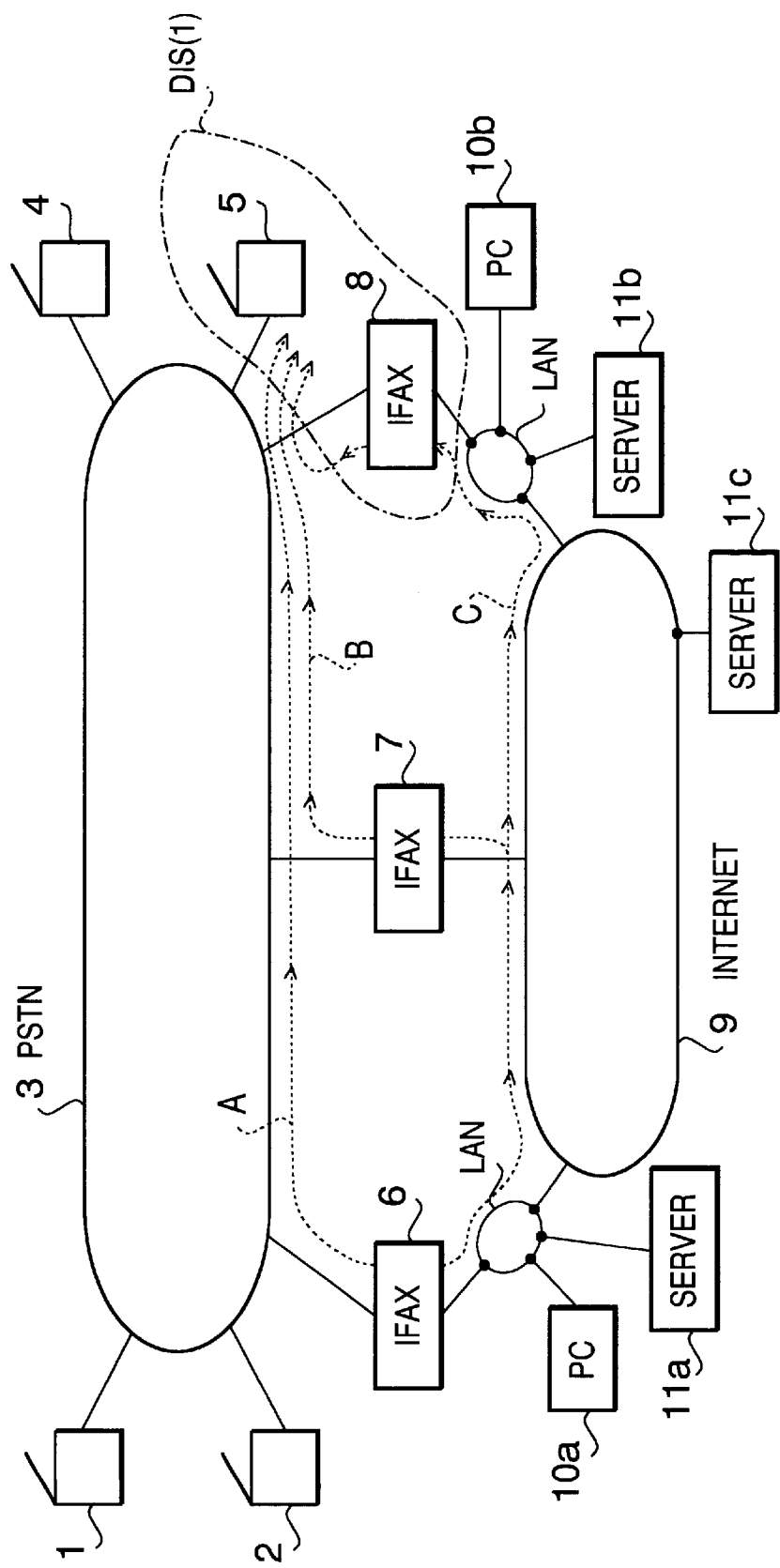
FIG. 1 is a network configuration when carrying out data communications using an Internet facsimile apparatus of the present invention as a relay apparatus.

FIG. 1 is a drawing showing the network configuration for image communications using an Internet facsimile apparatus according to an embodiment of the present invention.

Ordinary facsimile apparatuses 1, 2, 4 and 5 can communicate images only over PSTN 3. On the other hand, Internet facsimile apparatuses (hereinafter referred to as "IFAX") 6 to 8 can perform normal facsimile communications over PSTN 3. Internet facsimile apparatuses 6 to 8 can further communicate images with other IFAXs and personal computers (hereinafter referred to as "PC") or servers 11a, 11b and 11c, etc. over Internet 9, a world-wide computer network.

Image communications over a network are performed, for example, by compressing image data, converting them to a TIFF file and text-coding the TIFF file, then adding it to the data section of e-mail in accordance with such as MIME (Multipurpose Internet Mail Extensions) and transmitting/receiving it as E-mail.

Since IFAXs are connected to both PSTN 3 and the Internet 9, they also function as relay apparatuses between the PSTN 3 and the Internet 9. Thus, IFAXs can receive data from a network and convert the received data to a format adaptable to another network and transfer the converted data to the another network.

In the case of IFAX 6 transmits an image to ordinary facsimile apparatus 5, there are three transmission routes indicated by dotted arrows in FIG. 1. Thus, route A passing through PSTN 3 only, route B passing through IFAX 7 and route C passing through IFAX 8. Hereinafter, it is supposed that IFAX 8 is installed in the same district in the same country (DIS (1) in the figure) as facsimile apparatus 5, the recipient.

Since IFAX 8 is the one geographically nearest to facsimile apparatus 5, the recipient, it is advantageous in terms of communication costs to select the route using IFAX 8 as the relay apparatus.

Therefore, the present embodiment enables IFAX 8 providing the most effective transmission route to be automatically selected, improving the usability for the users.

Figure 2:
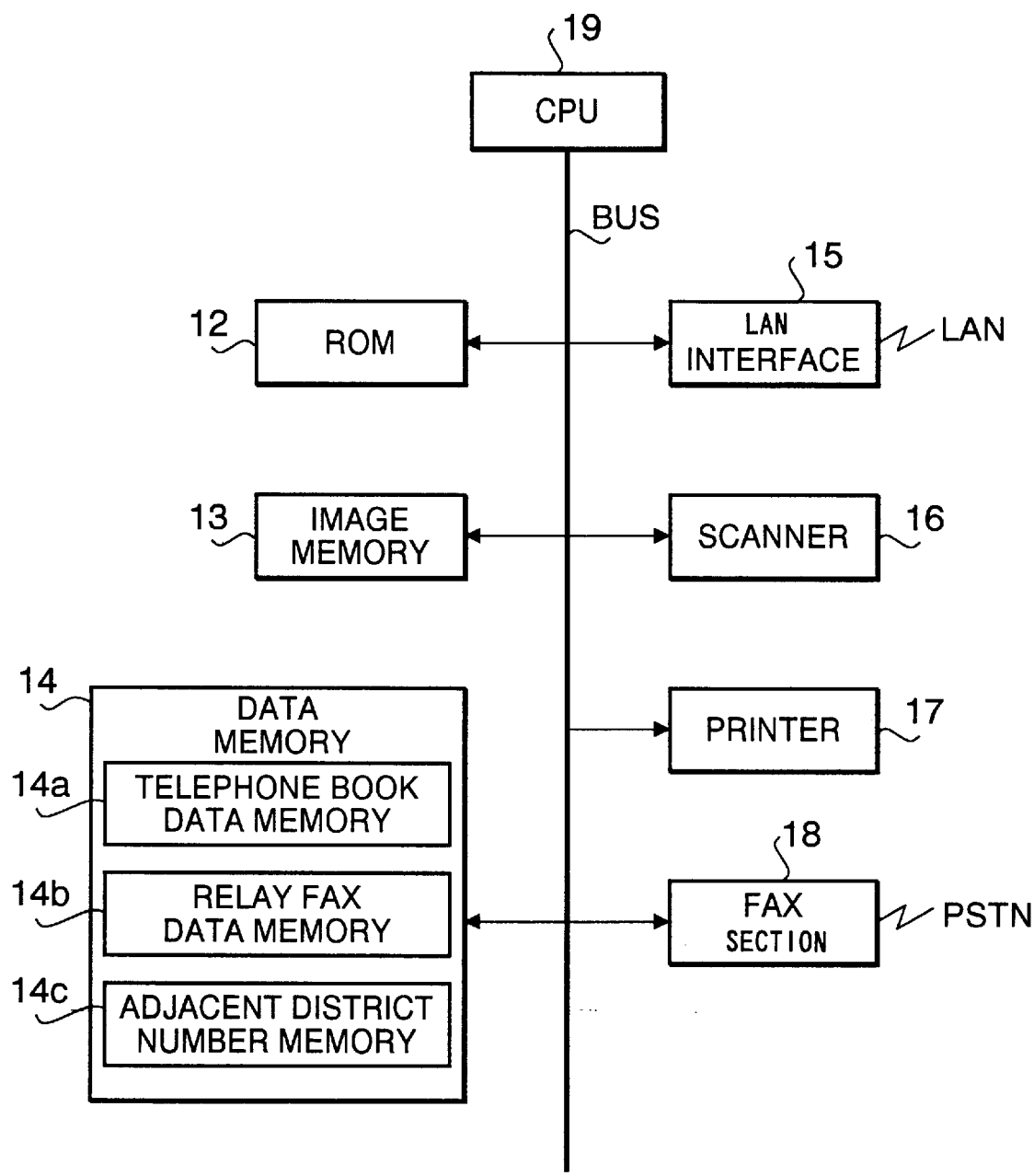
FIG. 2 is a block diagram showing the basic system configuration of an Internet facsimile apparatus according to an embodiment of the present invention.

FIG. 2 is a drawing showing the main system configuration of the IFAX according to the present embodiment.

As shown in the drawing, the main system of the IFAX comprises ROM 12, image memory 13, data memory 14, LAN interface 15, scanner 16, printer 17, FAX section 18, CPU 19, and these blocks are connected to one another over a bus and CPU 19 controls operations of the blocks in a centralized manner.

Here, data memory 14 contains telephone book data memory 14a, relay FAX data memory 14b and adjacent district number memory 14c.

Figure 3:
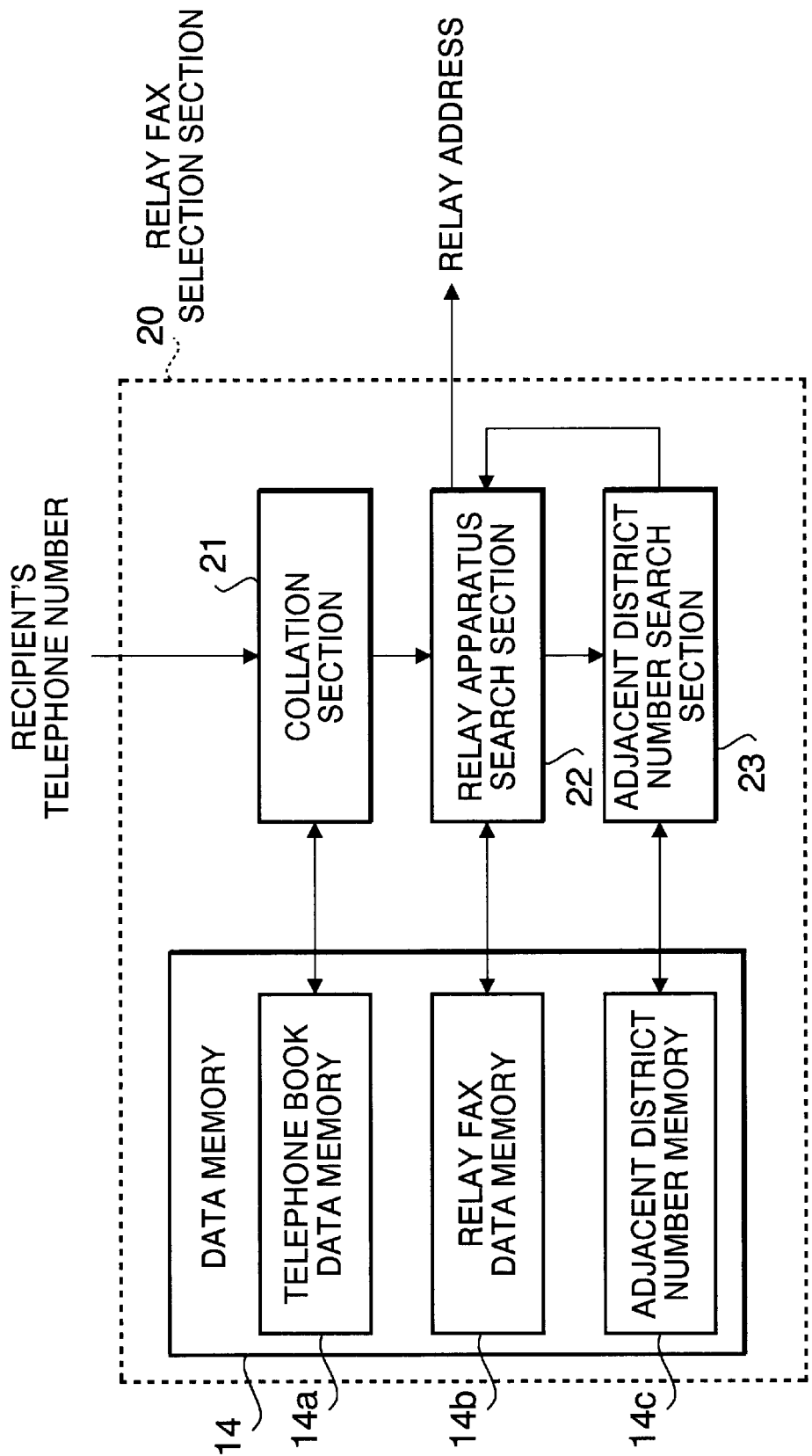
FIG. 3 is a block diagram showing the basic functional block configuration of an Internet facsimile apparatus according to the embodiment above.

ROM 12 stores a program to automatically select the relay IFAX and CPU 19 executes the program. The resulting functional blocks constructed are shown in FIG. 3.

Relay FAX selection section 20 comprises collation section 21, relay destination search section 22 and adjacent district search section 23.

When the telephone number of the recipient is input, collation section 21 collates the telephone number with telephone book data memory 14a. Here, the telephone number of the recipient is used in the same sense as the facsimile number of the recipient. If the corresponding telephone number or the one assumed to be the corresponding telephone number is found, the telephone number data registered in the telephone book are output. The telephone number data registered in telephone book data memory 14a are telephone number data containing geographical identification information including country identifiers, district identifier or the like.

The reason that the telephone number entered is not used as is but collated with the telephone book is that the telephone number entered is not always correct, and therefore it is necessary to be cautious enough, and even if it has been correctly entered, the country identifier (country number) still must be added to make data complete.

Thus, the telephone number entered by the user may be incomplete (for example, when a long-distance code is not input though it is required) or an unnecessary number may have been added (for example, a long-distance code is added although there is no space for it), or a wrong number has been entered. Therefore, it is necessary to make sure whether the data corresponding to the telephone number data entered actually exist in the telephone book or whether the data assumed to correspond to the telephone number data entered actually exist.

When communications are performed in a country, for example, Japan, it is not necessary to enter the country number of the country (country identifier) every time. However, in order to search the table using the world district information of the telephone number, it is necessary to add the Japanese country number at the beginning of the telephone number even for domestic communications and keep it as telephone number data that can identify at least the country and district. Therefore, the telephone book data including the country number (country identifier) identified as a result of collation with the telephone book are used as search data for the relay apparatus selection table. Here, the telephone book data can also include resolution information, etc. necessary for image reproduction in addition to the telephone number data.

Relay apparatus search section 22 searches for relay FAX data memory 14b based on identification information such as country, district, city of the telephone book data (telephone number data) output from collation section 21 (including resolution information, etc. necessary for image reproduction if necessary) and selects a preferable relay facsimile apparatus.

Furthermore, if the result of a search by relay apparatus search section 22 shows that there are relay facsimile apparatuses with the matched country but none with the matched district, adjacent district number search section 23 searches, as the second best measure, for adjacent district number memory 14c to select a relay from a district adjacent to the district and obtains the adjacent district number. Here, "adjacent" refers to a district adjacent to the district to which the recipient belongs. It is naturally possible to select a relay candidate IFAX from among "other districts which are geographically near," not limited to an adjacent district.

FIG. 4 shows an example of data content stored in telephone book data memory 14a. FIG. 5 shows an example of data content stored in relay FAX data memory 14b and FIG. 6 shows an example of data content stored in adjacent district number memory 14c. All data stored in memory are listed in a table form to facilitate searching.

As shown in FIG. 4, in the tables in telephone book memory 14a (hereinafter referred to as "telephone book table"), numbers preceding the lower 4 figure of the telephone number are classified into country identifier (country ID number), district identifier (district ID number), city identifier (city ID number), and thus data are stratified using these identifiers.

Furthermore, as shown in FIG. 5, relay FAX data memory 14b uses a country identifier (country ID number), district identifier (district ID number), city identifier (city ID number) of the telephone number as indices, and mail address of each IFAX on the Internet is listed in connection with the IFAX function/performance (resolution, transfer speed) in a table. A mail address of an IFAX installed in the same district as that indicated by the telephone number is selected as the above mail address listed in the table, in principle.

Telephone numbers are used as indices because comparing geographical identification information of telephone numbers allows an effective search of relay apparatuses.

The reason that the IFAX function/performance information including resolution and transfer speed of the IFAX is stored together in the table is to make it possible to select the most suitable relay apparatus after considering not only the geographical distance but all the factors such as the resolution of images to be transmitted and the transfer speed of the sender IFAX.

Furthermore, as shown in FIG. 6, adjacent district number memory 14c lists up in a table, district identifiers (district numbers) of telephone numbers as indices in connection with district identifiers (expressed as ADJACENCY A and ADJACENCY B in the drawing) of the districts adjacent to the districts indicated by the district numbers above. This makes it easier to obtain the district identifiers (district numbers) of the adjacent districts from among district identifiers (district numbers) of telephone numbers.

Figure 7:
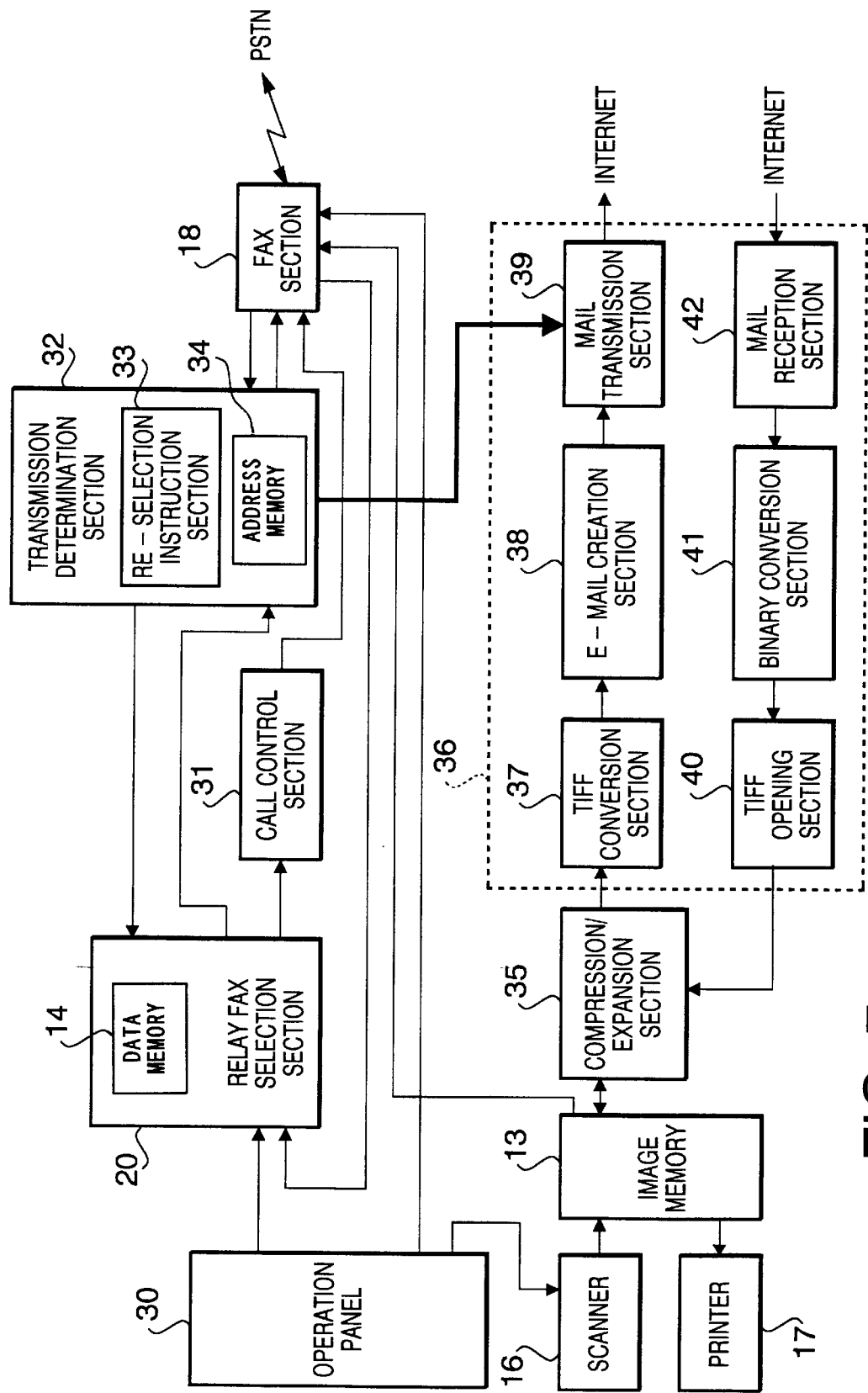
FIG. 7 is a block diagram showing the detailed configuration of the Internet facsimile apparatus according to the embodiment above.

FIG. 7 is a block diagram showing the detailed configuration of the main part of the IFAX of the present embodiment.

The IFAX in FIG. 7 operates as shown below when transmitting image data over the Internet.

When the user enters the telephone number of the recipient from operation panel 30 and presses the transmission button, scanner 16 starts to scan a document set in the document stand (not shown in the figure). The image data scanned by scanner 16 are stored in image memory 13, compressed by compression/expansion section 35 and entered in E-mail processing section 36.

In E-mail transmission section 36, TIFF conversion section 37 converts compressed image data to a TIFF file and E-mail creation section (text coding section) 38 encodes the TIFF file in text code and enters it in the data section of e-mail in accordance with such as MIME.

Relay FAX selection section 20 shown in FIG. 3 selects the IFAX which will be the nearest relay apparatus based on the telephone number of the recipient entered. This selection operation is explained later using FIG. 9 to FIG. 11. The address of the selected relay apparatus is not only handed over to call control section 31 but also sent to address memory 34 in transmission determination section 32 and stored.

Then, call control section 31 controls FAX section 18 to call the selected IFAX.

Transmission determination section 32 determines whether a normal response has been received. If there is a response it gives an address stored in address memory 34 to mail transmission section 39. On the other hand, if there is no normal response, it determines that the IFAX is failing as the relay apparatus and re-selection instruction section 33 instructs the FAX selection section 20 to reselect. In response to this, relay FAX selection section 20 selects an IFAX that meets the condition from among other relay candidates. This is followed by similar operations.

When it is confirmed that the selected relay apparatus is functioning normally, the address stored in address memory 34 of transmission determination section 32 is given to mail transmission section 39 in E-mail processing section 36. Then, mail transmission section 39 transmits E-mail including a TIFF file as an accompanying file to the relay IFAX.

FIG. 8 shows an example of E-mail address. The first "ifax08" and "@rdmg.mgcs.mei.co.jp" indicates the address of the IFAX that will function as a relay apparatus and "#9999-9999" inserted in the middle indicates the telephone number of the recipient.

Therefore, upon reception of E-mail, the IFAX that will function as a relay apparatus converts the received data to a signal transmittable to a PSTN and transfers data to the facsimile apparatus with telephone number "#9999-9999."

The reception operation of the IFAX in FIG. 7 is shown below. The E-mail received by mail reception section 42 is converted to binary data by binary conversion section 41, returned to a TIFF file format data by TIFF opening section 40, then expanded by compression/expansion section 35, stored in the image memory 13 and printed out by printer 17 if necessary.

Then, the procedure for the selection processing of the relay apparatus in the IFAX of the present embodiment is explained using a flow chart.

Figure 9:
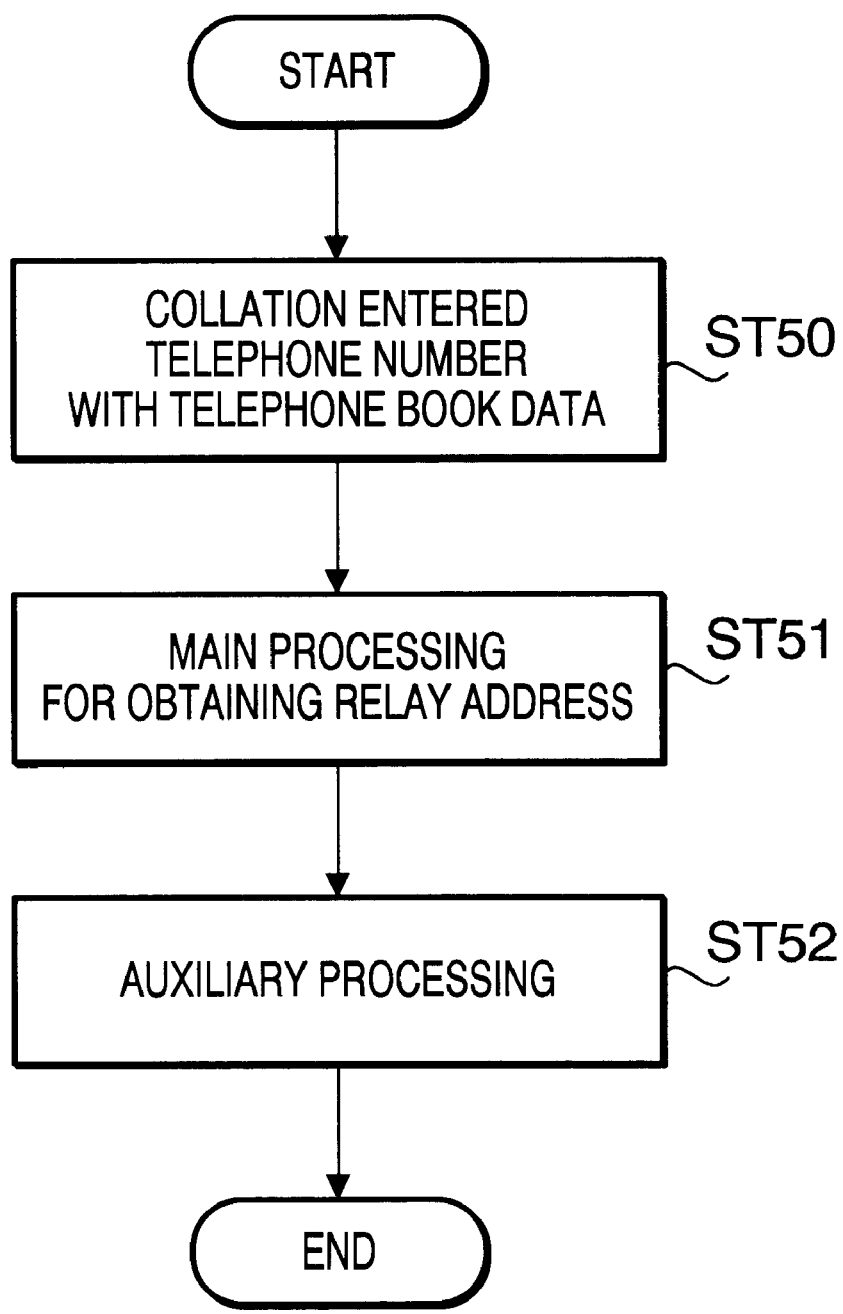
FIG. 9 is a flow chart showing a characteristic operation of the Internet facsimile apparatus according to the embodiment above.

As shown in FIG. 9, the selection processing of a relay apparatus is roughly divided into collation with the telephone book data (ST50), main processing to obtain the relay address (ST51) and auxiliary processing (ST52). The main processing selects one relay apparatus by searching the relay FAX data memory and the auxiliary processing selects one of relay candidates as the second best measure when the relay apparatus could not be selected or the selected relay apparatus was failing, etc.

Each processing is explained in detail below.

Figure 10:
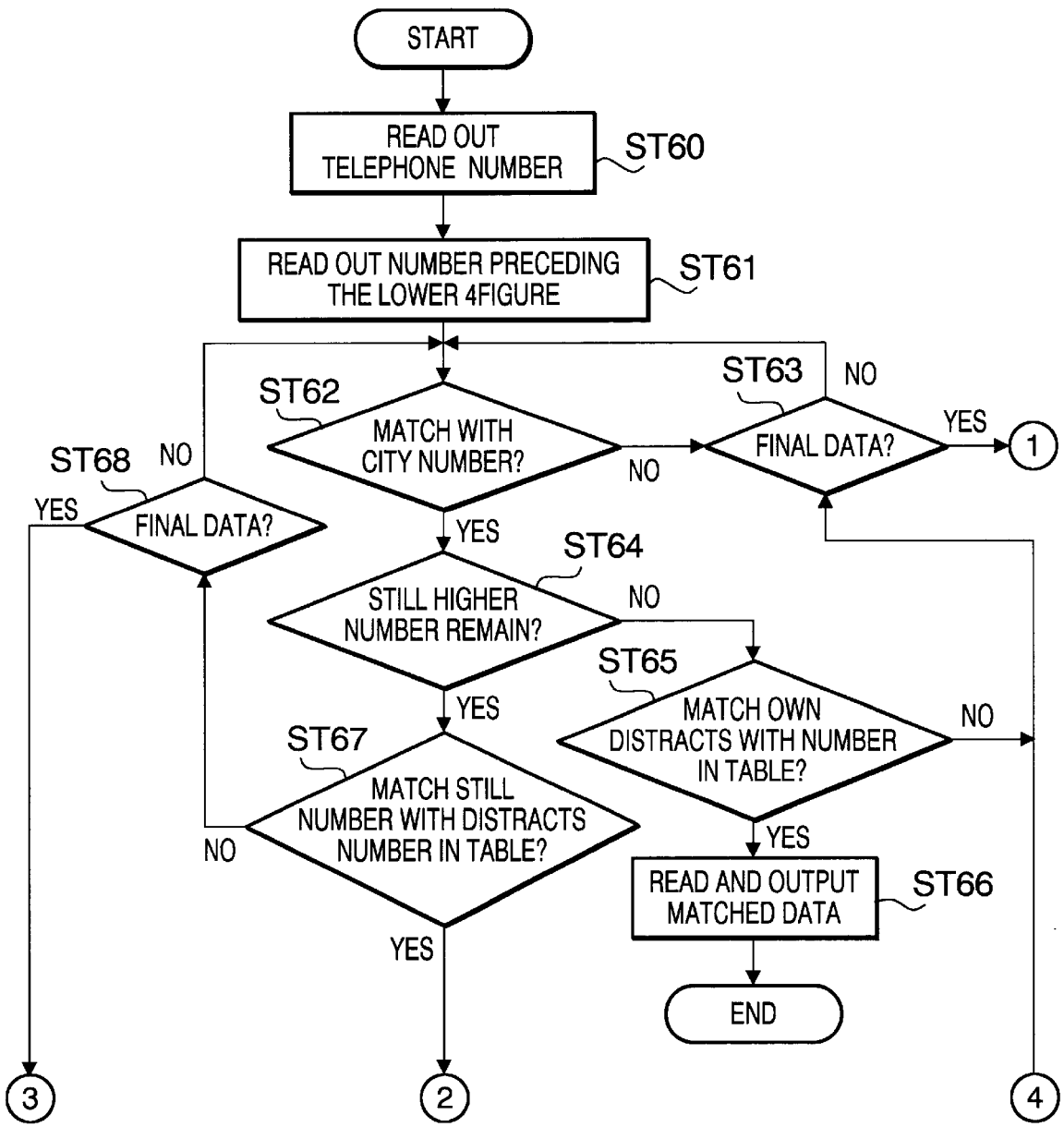
FIG. 10 and FIG. 11 are flow charts showing the procedure for comparing with telephone book data in the Internet facsimile apparatus according to the embodiment above.
Figure 11:
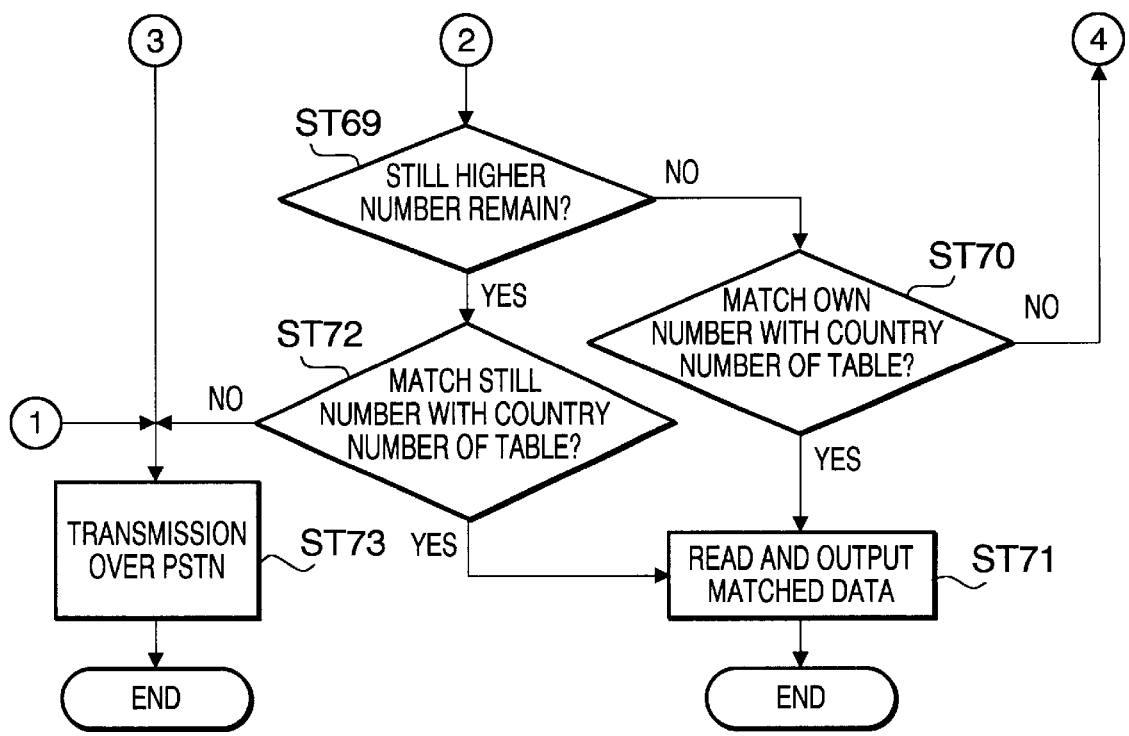

FIG. 10 and FIG. 11 are flow charts showing the procedure for collation with the telephone book data.

First, the telephone number entered is read out from a memory (step (hereinafter referred to as "ST") 60), then numbers preceding the lower 4 figure of the telephone number are loaded (ST61). The reason that the lower 4 figure are discarded is that those numbers are the numbers to specify individuals, and they neither include geographical information nor serve for selection of relay apparatuses.

Then, the loaded telephone numbers are compared with the telephone book table in FIG. 4. First, city numbers (city identifiers) are compared (ST62) and if they do not match and other city numbers are registered in the table, they are compared with those city numbers one by one (ST63 and ST62).

On the other hand, if some city numbers match in ST62, it is checked whether still higher numbers (higher identifiers) remain in the telephone numbers loaded (ST64). If no numbers remain, it means that no district numbers are found in the telephone numbers entered. In this case, the district number of the data in the telephone book table in FIG. 4 for which the city number resulting from the comparison in ST62 matches is compared with the district number (district identifier) of the telephone number of the own machine (IFAX which is trying to transmit an image, that is, IFAX6 in FIG. 1) and if they match (ST65), it can be assumed tentatively that the IFAX is trying to make a call to the same district that the own machine is installed. Therefore, assuming tentatively that the district number (district identifier) of the telephone number entered has been identified, the matched data in the telephone book table in FIG. 4 are read out and output (ST66).

On the other hand, if ST65 results in a mismatch, ST63 determines whether it is the final data or not (whether there are still other data to be compared in the table or not) and if it is the final data, the processing jumps to ST73, stops relay transmission and switches to communication over the PSTN (ST73). If the data are not the final data in ST63, the processing returns to ST62.

On the other hand, if higher numbers remain in ST64, they are compared with district numbers of the telephone book table (ST67). If they do not match here, and if there are other data to be compared in the table (ST68), the processing returns to ST62, and if there are no data to be compared, the system stops relay transmission and switches to communication over the PSTN (ST73).

If they match in ST67, it is determined whether still higher numbers remain or not (ST69), and if they remain, the remaining numbers (i.e., country number of telephone number entered) are compared with the country numbers of the telephone book table (ST72) and if they match, the data of the telephone book table are read out and output (ST71). If they do not match in ST72, the system stops relay transmission and switches to communications over the PSTN (ST73).

If higher data do not remain in ST69, it means that no country numbers (country identifiers) are included in the telephone number entered. In this case, the country number of the data of the telephone book number table in FIG. 4 is compared with the country number of the telephone number of the own machine (IFAX which is trying to carry out facsimile transmission, i.e., IFAX6 in FIG. 1) (ST70). As a result, if they do not match, the processing returns to ST63 and if they match, it is assumed that the IFAX is trying to transmit to a domestic apparatus (i.e., the country in which the own machine is installed), and therefore the data of the telephone book table are read out and output (ST71).

Based on the identification information of the telephone number data obtained as a result of collation with the telephone book table above, then the table of the relay FAX data memory is searched for and the address of the relay apparatus is obtained. This procedure is explained using FIG. 12 and FIG. 13.

First, the country number (country identifier) of the obtained telephone number is compared with the country numbers of all data in the table (FIG. 5) stored in the relay FAX memory (ST80), and all matched numbers are stored (ST81). Then, it is compared with the district number of the stored data (ST82) and all matched numbers are stored (ST83). Then, it is compared with the city number of the stored data (ST84) and all matched data are stored (ST85). If no match is found in ST80, ST82 and ST84, the processing moves to ST90.

In ST90, it is checked whether the data stored in the above ST 81,83,85 (matched data) exist or not, and if no such data exist, the system stops relay transmission and switches to communications over the PSTN (ST91). On the other hand, if data stored in ST90 (matched data) exist, the system outputs the information of that data (ST92), reads out its address (ST93) and sends E-mail (ST94).

If the performance of the relay apparatus is also included in the selection conditions (for example, when the user entered conditions from the operation panel), ST86 to ST89 are inserted between ST85 and ST90. That is, the data matching the required performance are searched for in the table in FIG. 5 (ST86). That is, they are compared in the resolution and transfer speed and all matched table data are stored (ST89). The processing then moves to ST90.

This is the basic processing for selecting the relay destination (processing for relay address acquisition).

Figure 12:
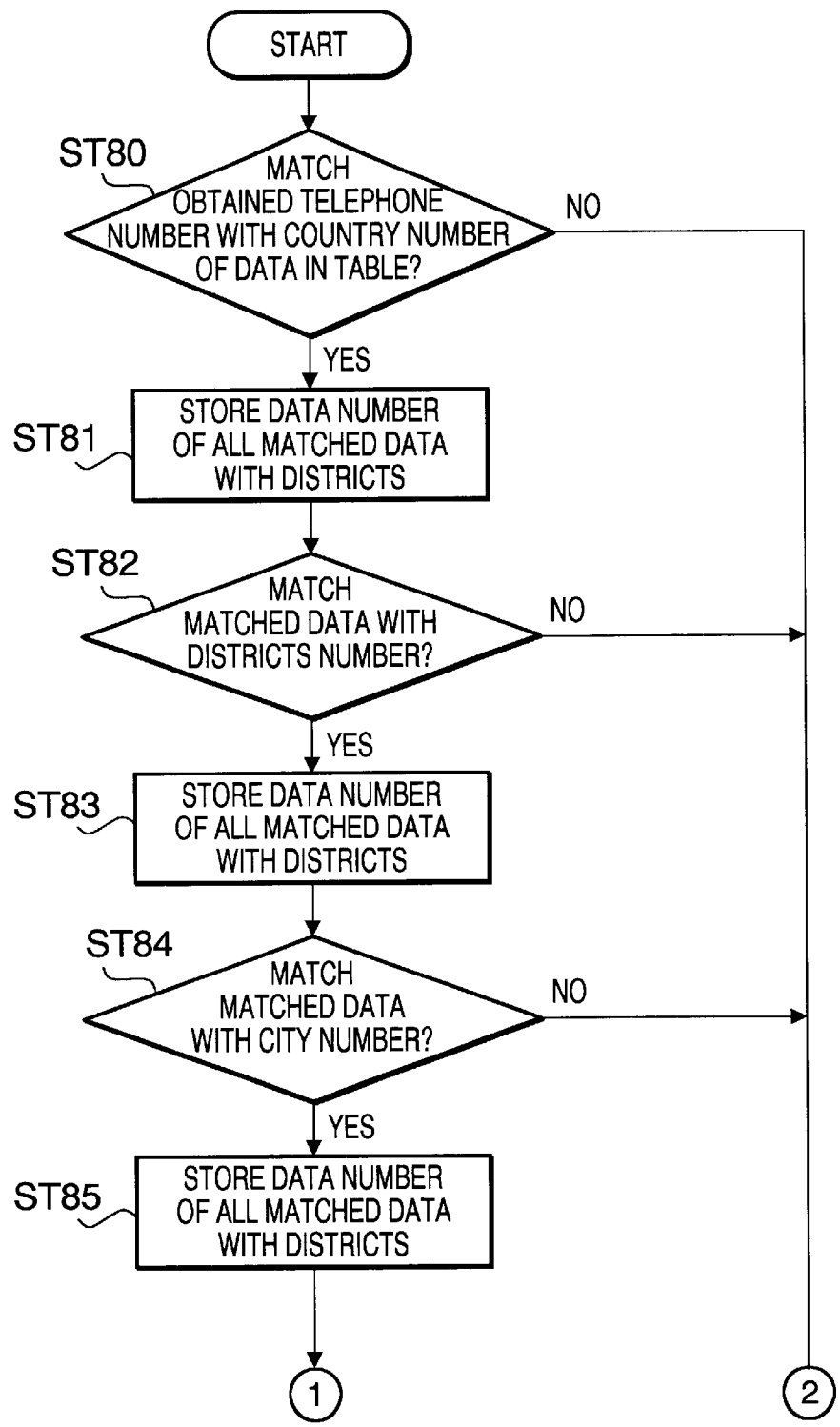
FIG. 12 and FIG. 13 are flow charts showing the procedure for acquiring relay addresses in the Internet facsimile apparatus according to the embodiment above.
Figure 13:
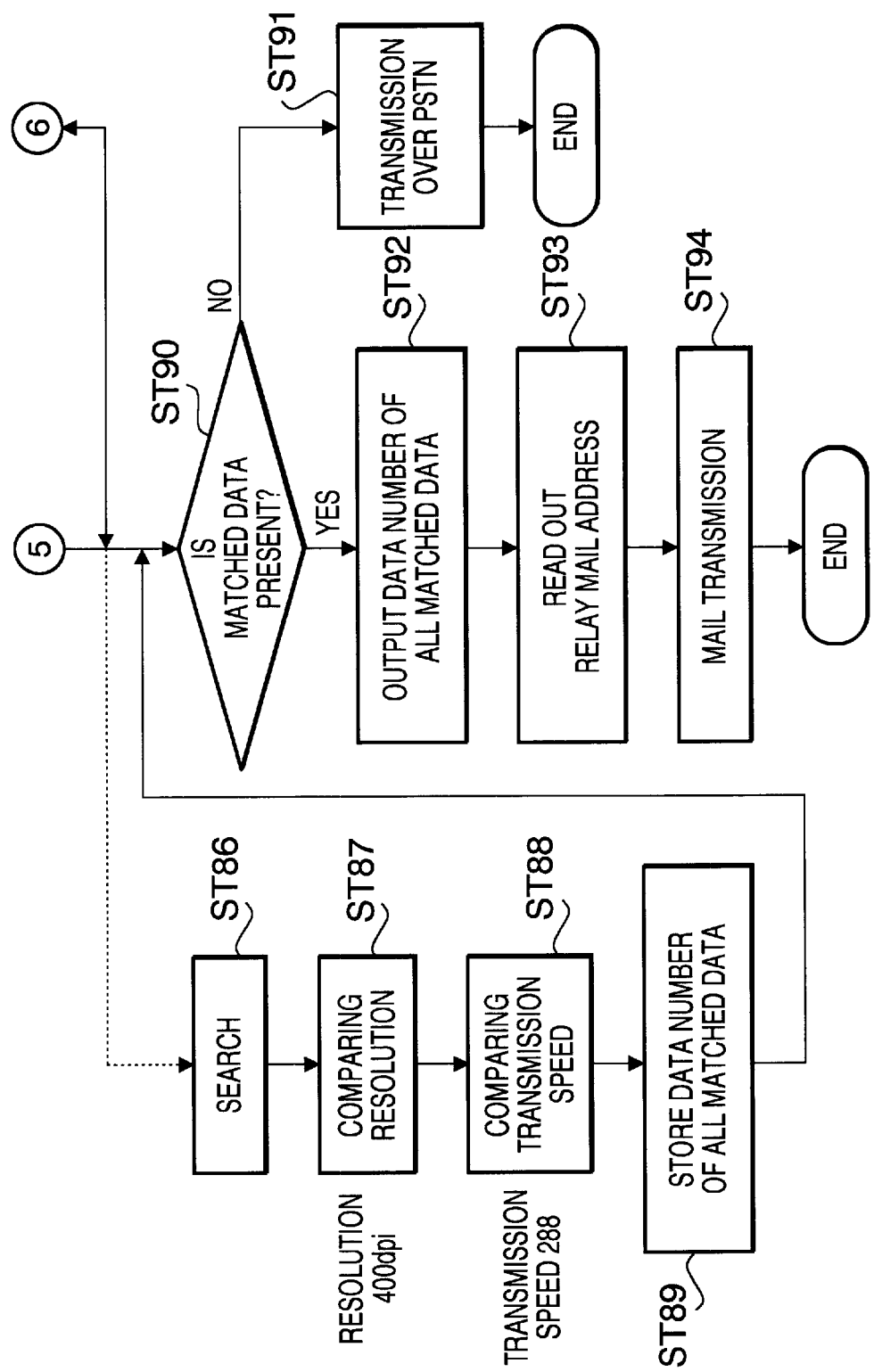

However, if the district number does not match in ST82 in FIG. 12, only the apparatus (IFAX) with matched country number is selected as the relay apparatus, but such a selection may not always be a correct one.

Therefore, if the district number does not match, it is desirable to try to use an auxiliary method of selecting an apparatus (IFAX) in an adjacent district in the same country as the relay destination.

Figure 14:
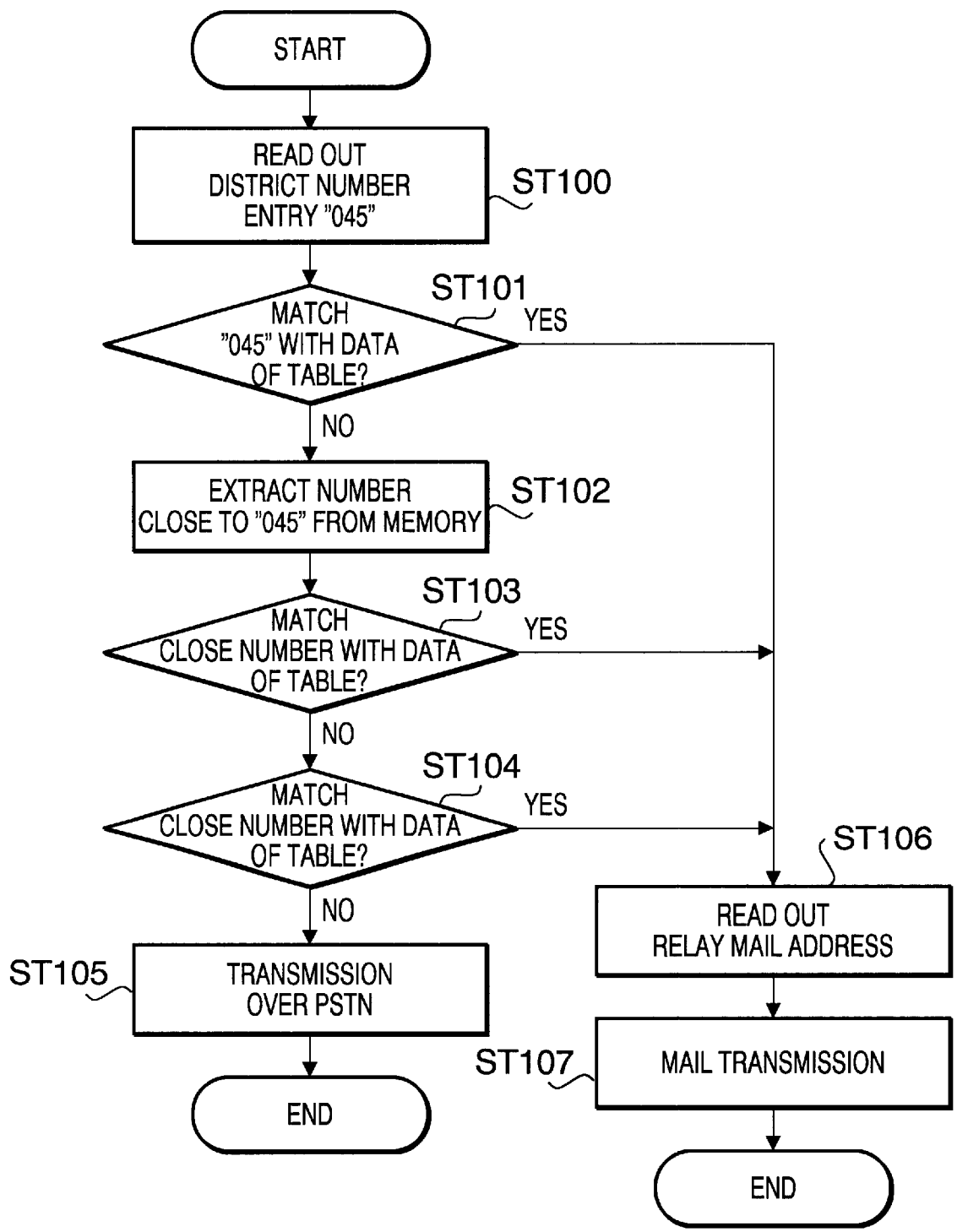
FIG. 14 is a flow chart showing the procedure for searching for adjacent district numbers in the Internet facsimile apparatus according to the embodiment above.

In this case, ST102 and subsequent steps in FIG. 14 are executed to obtain the district number of the adjacent district and select the IFAX with that district number as the relay destination.

In FIG. 14, the district number is read out form the table in FIG. 5 (ST100) and data matching that district number are searched for (ST101). However, if none of them matches, the second best measure is to search for the adjacent district number memory in FIG. 6 and obtain district data of the adjacent district (ADJACENCY A or ADJACENCY B) and the district number is searched for from the table in the relay FAX data memory in FIG. 5 (ST103 and ST104). If the corresponding number is still not found, relay transmission is abandoned and transmission over the PSTN is used instead (ST105). If the corresponding number is found, the FAX apparatus with that district number is selected as a relay apparatus, the address incorporated (ST106) and E-mail transmitted (ST107). If there are no adjacent district data, the next best measure would be to select an apparatus in a geographically nearby district as a relay apparatus.

Even if the steps in FIG. 10 and FIG. 11 could be executed to select the relay apparatus, it is not clear whether the relay apparatus is currently operable, and especially when the relay apparatus is installed in a foreign country, the sense of uncertainty is all the more greater because its situation is not clear. In such a case, it is desirable to transmit E-mail not immediately, but after carrying out the processing in FIG. 15 and making sure that the relay apparatus is actually operating.

Figure 15:
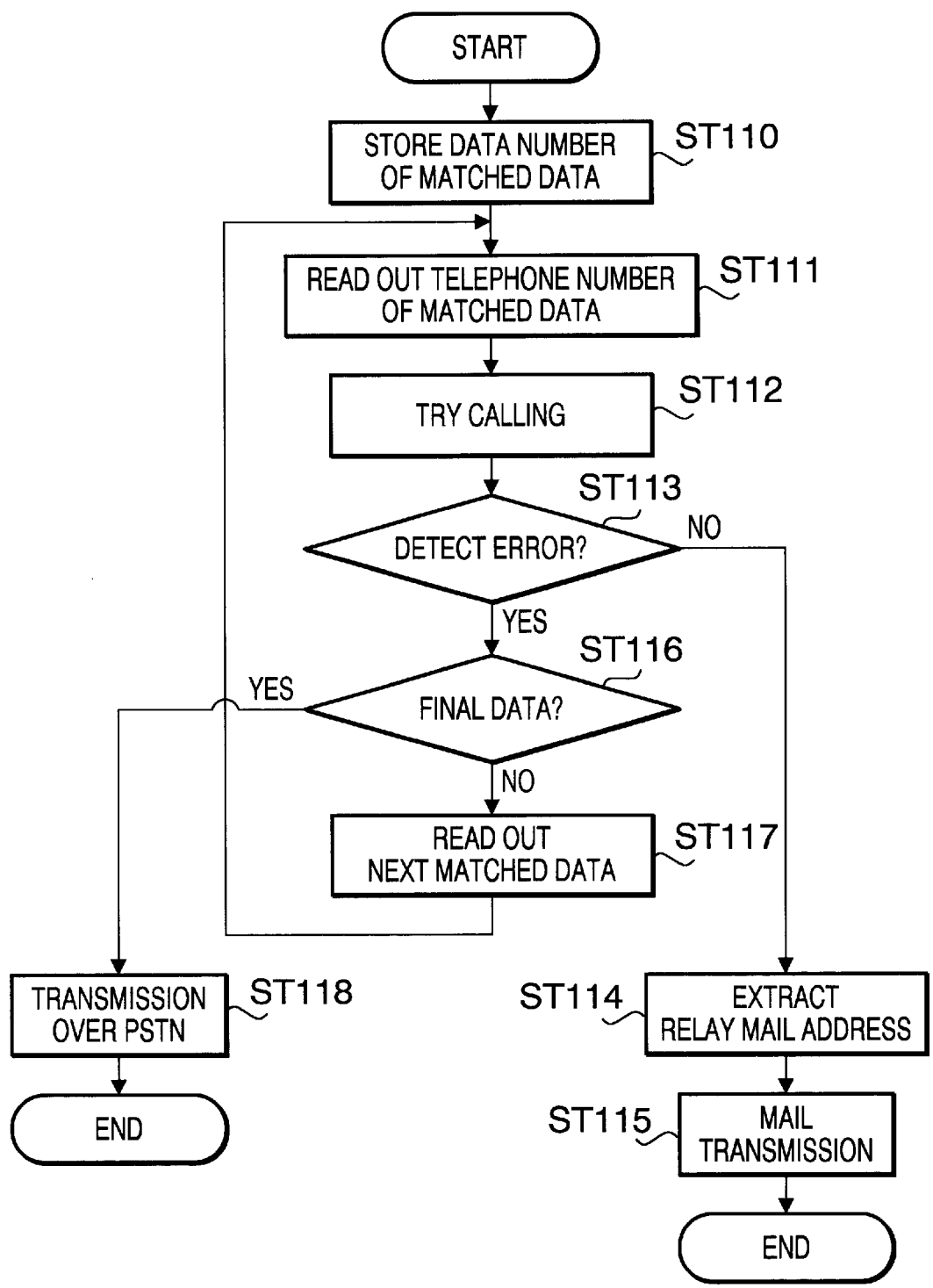
FIG. 15 is a flow chart showing the procedure for detecting failures in the Internet facsimile apparatus according to the embodiment above.

FIG. 15 shows the processing procedure in such a case. Thus, the matched data (relay destination candidate data) are stored in a memory (ST110), the telephone number is read out from the memory and a recipient having the telephone number is called (ST111 and ST112). If, as a result, no response or no normal response is received from the recipient (ST113), the use of the apparatus as a relay apparatus is abandoned. If another candidate exists (ST116), the data are incorporated (ST117) and the processing returns to ST111. If there is only one relay destination candidate and the relay apparatus candidate apparatus is failing in ST116, relay transmission is abandoned and transmission over the PSTN is used instead (ST118).

On the other hand, if normal operation of the relay candidate apparatus is confirmed in ST113, the relay mail address of the relay candidate apparatus is extracted from the memory (ST114) and E-mail transmitted (ST115).

As shown above, the present embodiment allows a relay destination IFAX to be selected automatically based on the telephone number of the recipient. Furthermore, since selection of the relay apparatus is proceeded carefully through multiple steps of confirmation procedure, it can avoid such a case that erroneous selection would rather increase communication expenses.

The table shown in FIG. 6 maintains the correspondence between telephone number data and addresses of relay apparatuses. The IFAX of the present embodiment obtains the addresses of relay apparatuses by referencing this table. Thereby, it extremely easy for the IFAX to obtain the relay address.

The IFAX in the present embodiment compares at least one of the country identifier, district identifier or city identifier of the telephone number of the recipient with the corresponding identifier in the telephone number data in the telephone book table in FIG. 4. If at least one identifier is found, the address corresponding to the matched telephone number data is treated as the address of the relay destination candidate. Thus, the identifier information of the telephone number entered is compared with the corresponding identifier information of the data registered in the table. Thereby, a simple and exact way of selecting the relay destination using the district identification information of the telephone number is provided. It can also simplify the circuit configuration for selecting the IFAX relay apparatus.

Furthermore, the IFAX of the present embodiment compares the country identifier and district identifier of the telephone number of the recipient with the corresponding identifiers in the table in FIG. 5. If this result shows that this table only registers data with a matched country identifier but with a mismatched district identifier, the relay destination candidate is selected from among the telephone number data with the same country identifier and a different district identifier. Thereby, it possible to select a relay apparatus in a different district as the second best measure even if no match is found in the district, which will improve the degree of freedom in selecting the relay destination.

Furthermore in the above case, the IFAX of the present embodiment may also select the relay destination candidate from among telephone number data with the same country identifier and a district identifier indicating a district geographically close to the district indicated by the district identifier above. In this case, since an apparatus installed in a nearby district is selected as a relay apparatus, there is little probability that an inappropriate relay route might be selected.

As shown above, the present invention has been explained using this embodiment, but the present invention is not limited to this embodiment and can be modified or applied in different ways. For example, instead of providing the Internet facsimile apparatus itself with a section for automatically selecting a relay apparatus, the section can be installed on personal computers 10a and 10b, or servers 11a to 11c in FIG. 1. In this case, even an Internet facsimile apparatus without an automatic relay apparatus selection function can also automatically select the relay destination by collecting data from the network.

In this case, there is no need to add an extra function to the Internet facsimile apparatus, eliminating anxiety about an increase of both costs and size of the apparatus.

The above embodiment took the facsimile apparatus as an example of communication terminal, but the scope of the present invention also includes other image communication terminals. For example, the present invention includes a PC provided with a LAN card or modem to have access to the Internet. It is possible to connect a scanner or printer to the PC above via an external I/F. The present invention also includes a network scanner or network copier having a network communication interface. Furthermore, the present invention also includes image decoders having functions such as a scanner, printer, copier and FAX.

The present invention also includes a computer readable storage medium storing program codes which allows the computer to execute the same processing as the facsimile apparatus according to the embodiment above.

The present invention is not limited to the above described embodiments, and various variations and modifications may be possible without departing from the scope of the present invention.

This application is based on the Japanese Patent Application No.HEI11-32859 filed on Feb. 10, 1999, entire content of which is expressly incorporated by reference herein.

What is claimed is:

1. A communication apparatus connected to a plurality of relay apparatuses via a computer network, the relay apparatuses connected to a telephone network, the communication apparatus comprising:

a memory configured to store a plurality of telephone number data including country identifiers and district identifiers, and e-mail addresses of the relay apparatuses, each e-mail address being stored in connection with one of the telephone number data;

an input section configured to input a telephone number of a destination connected to one of the relay apparatuses via the telephone network;

a relay apparatus selector configured to refer to a plurality of telephone number data in said memory to obtain an e-mail address of one of the relay apparatuses, based on the telephone number of the destination;

an e-mail transmitter configured to transmit e-mail data to the relay apparatus obtained by said relay apparatus selector, the relay apparatus converting the e-mail data into facsimile data to transmit to the destination via the telephone network;

wherein if, as a result of comparing a country identifier and a district identifier of the telephone number of the destination with the corresponding identifiers in said memory, said relay apparatus selector determines that said memory registers data with a matched country identifier but with a mismatched district identifier, said relay apparatus selector selects a relay apparatus candidate from among the telephone number data with the identical country identifier and a different district identifier indicating a district geographically close to the district indicated by said district identifier.

2. The communication apparatus according to claim 1, further comprising a facsimile transmitter configured to perform facsimile communications over the telephone network.

3. The communication apparatus according to claim 1, wherein said memory is further configured to register relay apparatus functional information and if said relay apparatus selector references the functional information of the relay apparatus and determines that the relay apparatus cannot accept transmission data, said relay apparatus selector is configured to select another relay apparatus as a relay apparatus candidate.

4. A communication apparatus configured to transmit e-mail data to a plurality of relay apparatuses via a computer network to transmit to a destination connected to a relay apparatus of the plurality of relay apparatuses via a telephone network, each of the relay apparatuses configured to convert the e-mail data into facsimile data, the communication apparatus comprising:

a telephone book data memory configured to store telephone number data including a country identifier of the destination connected to the telephone network:

a relay apparatus data memory configured to store at least the telephone number data and e-mail address data of a relay apparatus of the plurality of relay apparatuses, which belongs to both the telephone network and the computer network, and has a communication relay function;

a collator configured to collate the telephone of the destination with the telephone number data stored in said telephone book data memory, said collator also configured to confirm that the stored telephone number data contain at least data that can be assumed to correspond to the telephone number of the destination, said collator further configured to acquire the confirmed telephone number data;

a searcher configured to search said relay apparatus data memory to obtain e-mail address data of a relay apparatus of the plurality of relay apparatuses, corresponding to the acquired telephone number data;

a transmitter configured to transmit the e-mail data to the relay apparatus of the plurality of relay apparatuses, having the e-mail address data obtain by said searcher;

wherein said telephone book data memory stores a plurality of telephone number data including a country identifier and a district identifier of the destination, and said searcher is configured to obtain, if a district identifier of the obtained telephone number data does not match the district identifier in the telephone number data stored in said relay apparatus data memory, an e-mail address of a relay apparatus of the plurality of relay apparatuses having the district identifier indicating an adjacent district in the obtained telephone number data as the address of the relay apparatus candidate.

5. The communication apparatus according to claim 4, wherein:

said relay apparatus data memory is further configured to register functional information of a relay apparatus of the plurality of relay apparatuses; and said searcher is configured to reference the functional information of the relay apparatus of the plurality of relay apparatuses and select, if said searcher finds that said relay apparatus does not accept transmission data, another relay apparatus from among the plurality of relay apparatuses.

6. A communication apparatus configured to transmit e-mail data to a plurality of relay apparatuses via a computer network to transmit to a destination connected to a relay apparatus of the plurality of relay apparatuses via a telephone network, each of the relay apparatuses configured to convert the e-mail data into facsimile data, the communication apparatus comprising:

a telephone book data memory configured to store telephone number data including a country identifier of the destination connected to the telephone network:

a relay apparatus data memory configured to store at least the telephone number data and e-mail address data of a relay apparatus of the plurality of relay apparatuses, which belongs to both the telephone network and the computer network, and has a communication relay function;

a collator configured to collate the telephone of the destination with the telephone number data stored in said telephone book data memory, said collator also configured to confirm that the stored telephone number data contain at least data that can be assumed to correspond to the telephone number of the destination, said collator further configured to acquire the confirmed telephone number data;

a searcher configured to search said relay apparatus data memory to obtain e-mail address data of a relay apparatus of the plurality of relay apparatuses, corresponding to the acquired telephone number data;

a failure detector configured to detect failures of a relay apparatus of the plurality of relay apparatuses, by calling said relay apparatus over a PSTN prior to transmitting e-mail to the relay apparatus, wherein said failure detector is further configured to select another relay apparatus from among the plurality of relay apparatuses, when a failure of the relay apparatus is detected.

* * * * *

UNITED STATES PATENT AND TRADEMARK OFFICE
CERTIFICATE OF CORRECTION

PATENT NO. : 6,512,593 B1 Page 1 of 1
DATED : January 28, 2003
INVENTOR(S) : S. Yashiki It is certified that error appears in the above-identified patent and that said Letters Patent is hereby corrected as shown below:

Column 12,
Line 56, after "acquired telephone number data;" insert the following paragraph:
-- a transmitter configured to transmit the e-mail data to the relay apparatus of the plurality of relay apparatuses, having the e-mail address data obtained by said searcher; and --.

Signed and Sealed this

Fourth Day of November, 2003

JAMES E. ROGAN
*Director of the United States Patent and Trademark Office*